United States Patent
Wong et al.

(10) Patent No.: US 8,867,026 B2
(45) Date of Patent: *Oct. 21, 2014

(54) CHIP-SCALE OPTOMECHANICAL GRAVIMETER

(71) Applicant: The Johns Hopkins University, Baltimore, MD (US)

(72) Inventors: Chee Wei Wong, Weehawken, NJ (US); Ying Li, New York, NY (US); Jiangjun Zheng, New York, NY (US); Daniel J. Rogers, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/683,051

(22) Filed: Nov. 21, 2012

(65) Prior Publication Data

US 2014/0060178 A1 Mar. 6, 2014

Related U.S. Application Data

(63) Continuation-in-part of application No. 13/586,135, filed on Aug. 15, 2012, now abandoned, which is a continuation-in-part of application No. 13/587,689, filed on Aug. 16, 2012, now abandoned.

(60) Provisional application No. 61/524,055, filed on Aug. 16, 2011.

(51) Int. Cl.
| | |
|---|---|
| *G01L 1/24* | (2006.01) |
| *G01B 9/02* | (2006.01) |
| *G01V 7/00* | (2006.01) |
| *G01V 7/08* | (2006.01) |
| *G01V 7/16* | (2006.01) |

(52) U.S. Cl.
CPC ....................................... *G01V 7/005* (2013.01)
USPC .................... 356/35.5; 356/480; 73/382 R

(58) Field of Classification Search
CPC ......... G02B 1/005; G01V 7/00; G01V 7/005; G01B 11/161; G01B 2290/25
USPC ............... 356/35.5, 450, 480, 519; 73/382 R, 73/382 G See application file for complete search history.

(56) References Cited

U.S. PATENT DOCUMENTS

| 5,637,797 A | 6/1997 | Zumberge et al. |
| 6,668,111 B2 | 12/2003 | Tapalian et al. |

(Continued)

FOREIGN PATENT DOCUMENTS

JP 3527319 2/2004

OTHER PUBLICATIONS

Anderlini, M. et al. "kg-mass prototype demonstrator for dual gravitational wave detector: Optomechanical exciation and cooling". Physical Review D 80, 013001, Jul. 2, 2009, pp. 013001-1-013001-10.*

(Continued)

Primary Examiner — Michael A Lyons
(74) Attorney, Agent, or Firm — Noah J. Hayward

(57) ABSTRACT

An method and apparatus for measuring gravitational force are described where at least one first radiation can be provided to at least one optomechanical oscillator, the at least one optomechanical oscillator being structured to deform under the gravitational force to cause a shift in resonance associated with the at least one optomechanical oscillator. In addition, at least one second radiation is received from the at least one optomechanical oscillator, wherein the at least one second radiation is associated with the shift in the resonance, and the shift in the resonance can be determined based on the first and second radiations.

15 Claims, 13 Drawing Sheets

(56) References Cited

U.S. PATENT DOCUMENTS

| | | |
|---|---|---|
| 7,324,205 B2 | 1/2008 | Howard |
| 7,559,149 B2 | 7/2009 | Van Kann |
| 7,583,390 B2 | 9/2009 | Carr |
| 7,707,883 B2 | 5/2010 | DiFoggio |
| 7,751,044 B2 | 7/2010 | Csutak |
| 7,793,543 B2 | 9/2010 | Csutak |
| 7,814,790 B2 | 10/2010 | Van Kann |
| 8,028,577 B2 | 10/2011 | Niebauer |
| 8,113,041 B2 | 2/2012 | DiFoggio et al. |
| 2008/0034855 A1 | 2/2008 | Peeters et al. |
| 2008/0271533 A1* | 11/2008 | Csutak .................. 73/514.27 |
| 2009/0235740 A1* | 9/2009 | Carr ....................... 73/382 R |
| 2010/0071461 A1 | 3/2010 | Beverini et al. |

OTHER PUBLICATIONS

Hossein-Zadeh, Mani et al., "An Optomechanical Oscillator on a Silicon Chip", IEEE Journal of Selected Topics in Quantum Electronics, vol. 16, No. 1, Jan./Feb. 2010, pp. 276-287.

* cited by examiner

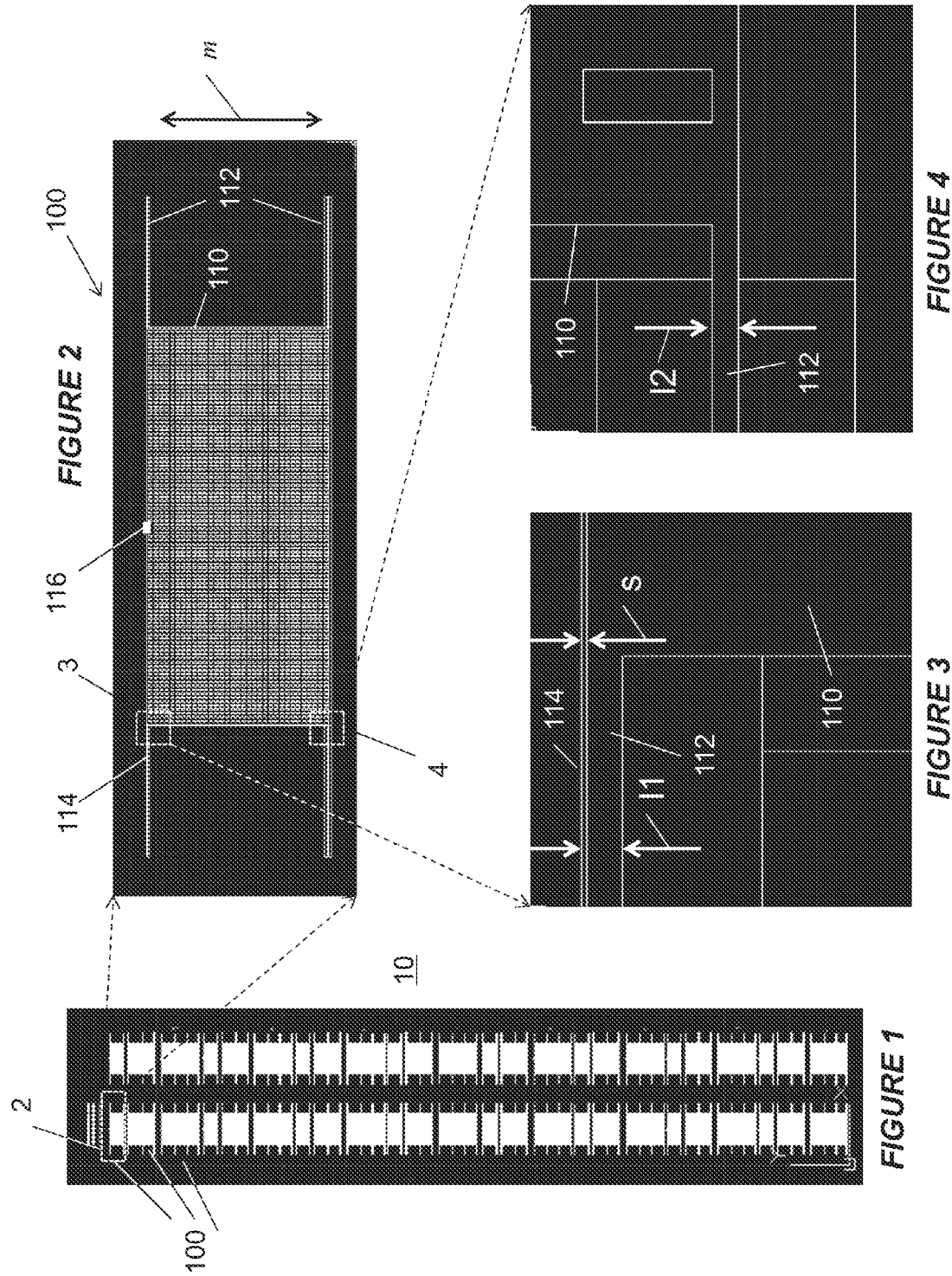

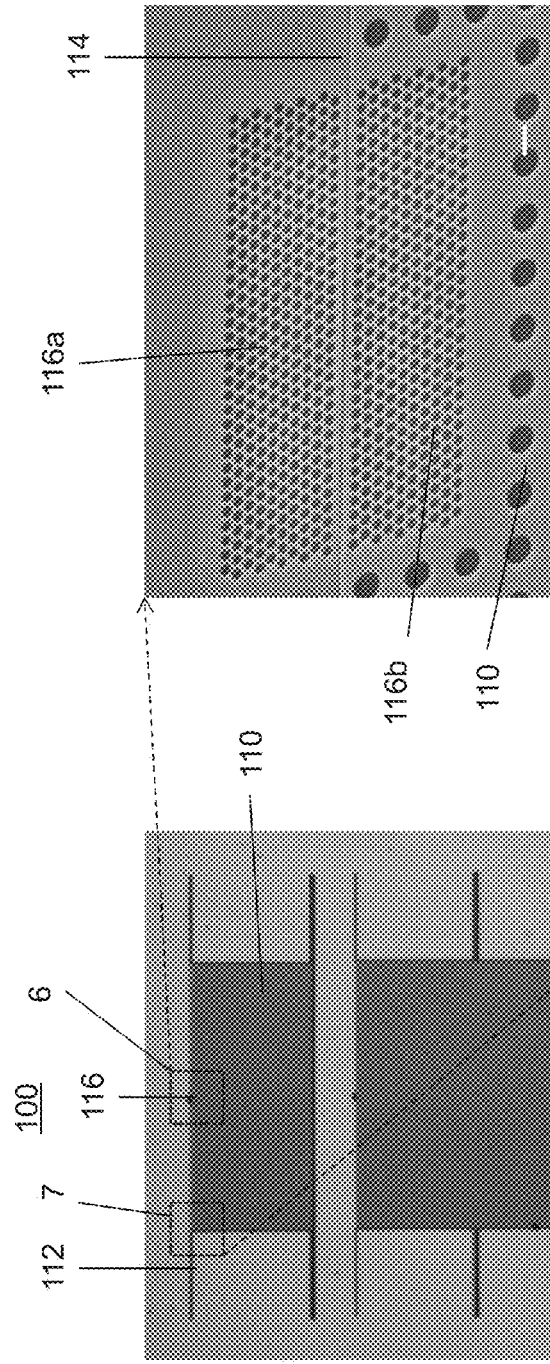
FIGURE 5
FIGURE 6
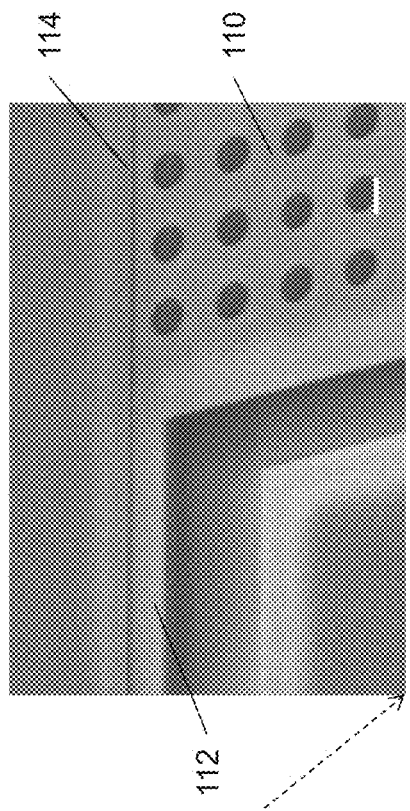
FIGURE 7

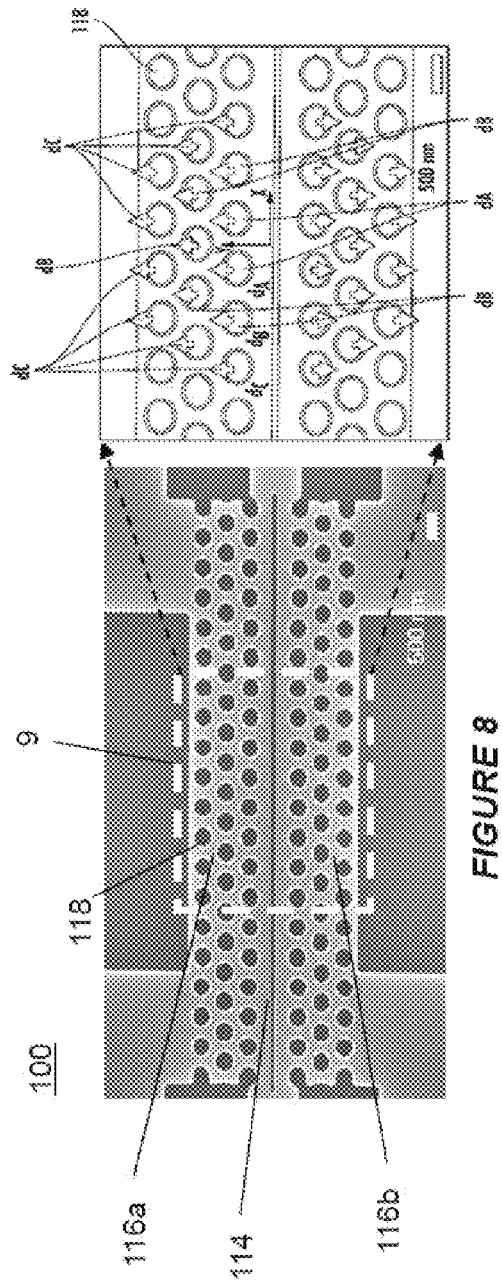
FIGURE 8
FIG. 9
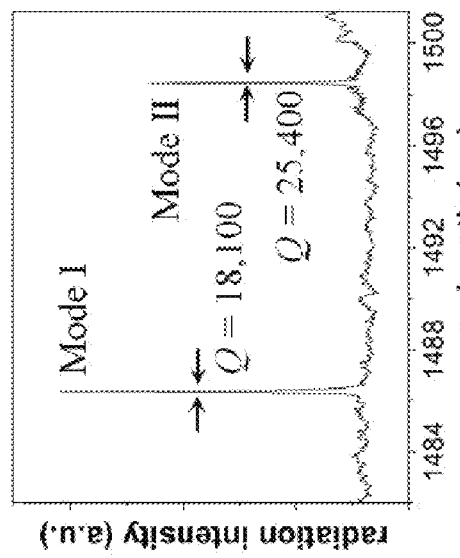
FIGURE 10

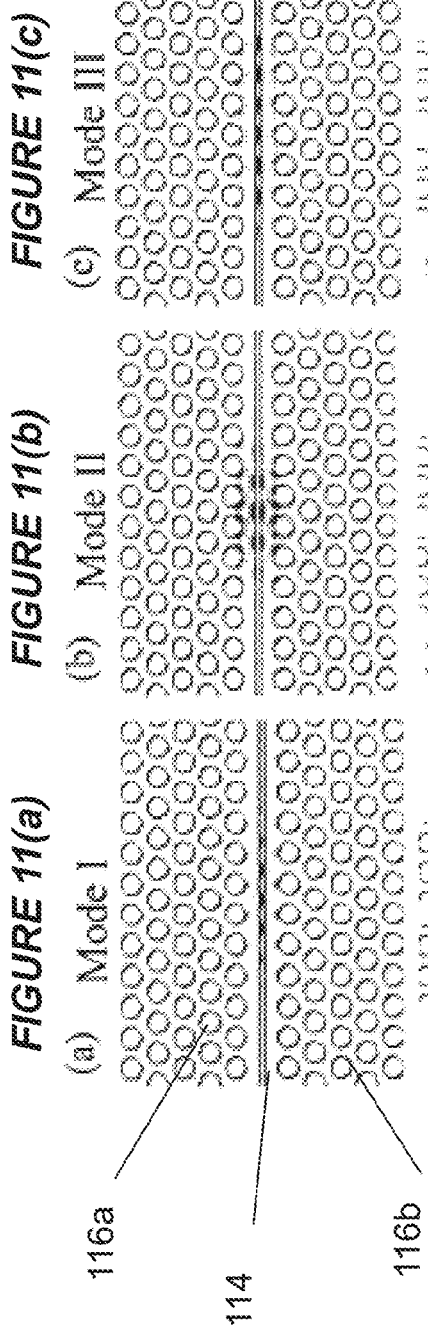
FIGURE 11(a) · FIGURE 11(b) · FIGURE 11(c)
FIGURE 11(d) · FIGURE 11(e) · FIGURE 11(f)
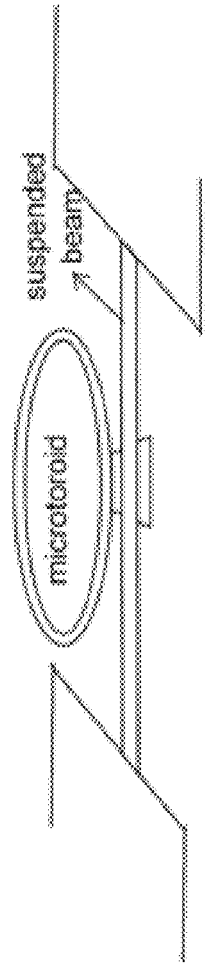
FIGURE 12

CHIP-SCALE OPTOMECHANICAL GRAVIMETER

CROSS-REFERENCE TO RELATED APPLICATIONS

This application is a continuation-in-part of co-pending U.S. patent application Ser. No. 13/587,689, entitled "APPARATUS FOR MEASURING GRAVITATIONAL FORCE AND METHODS OF USING THE SAME," filed Aug. 16, 2012, and co-pending U.S. patent application Ser. No. 13/586,135, entitled "CHIP-SCALE OPTOMECHANICAL GRAVIMETER," filed Aug. 15, 2012, each of which application claims priority to and the benefit of U.S. Provisional Application No. 61/524,055 filed on Aug. 16, 2011, the entireties of each of which are hereby incorporated by reference herein.

BACKGROUND

There are generally three main classes of gravimeters: (a) laser or atom interferometers using timed measurements, (b) cryogenic superconducting levitated masses, and (c) spring-type gravimeters.

Laser interferometers have been implemented commonly for precision metrology across many scales and allow absolute gravimetry measurements with 1 to 10 μGal accuracies. Typically, laser interferometers involve timed and multiple-sampled measurements with calibrated or stabilized lasers, including locked to atomic clocks, to measure the free-fall of a reflecting body. Recent advances, for example, have used cold atom interferometry to determine the gravitational redshift to an accuracy of $7 \times 10^{-9}$, improved precision of the gravitational constant to $1 \times 10^{-4}$, or the gravity to a sensitivity of 100 ng per shot. With the interferometric or timed measurements, however, significant isolation from the environment—be it laser stabilization or cooling—is often required, which might hinder portability or rugged field deployment realizations.

Superconducting gravimeters typically have low thermodynamical noise and low-drift, which can be due to the inherent stability of persistent currents in the superconductor, stability of the mechanical proof mass (e.g., a few grams), and insensitivity to ambient perturbations. Superconducting gravimeters, however, typically operate at cryogenic temperatures at ~4.2K or lower the even in a closed-cycle cryostat requires ~1 kW power for helium liquefaction, bringing challenges outside the laboratory environment.

The third class of gravimeters provides the spring-type approach for relative inertial force measurements. This approach is generally the most deployed. Prior work in the bulk involved simply an inclined spring to a cantilever beam (e.g., 10 cm spring) that gives a ~100 nm displacement for a ~10 ng relative gravity difference. This displacement can be sensed optically. The ensuing linearity about the zero-displacement point can provide a large measurement range; the use of quartz beams can alleviate concerns such as, e.g., hysteresis and fatigue in the sensor. This baseline design has been continuously modified and updated by, for example, Scintrex and sister company Micro-g La Coste, encompassing applications such as, e.g., mapping the deep ocean seafloor morphologies. In one particular implementation, the recent gPhone can achieve, for example, 100 nGal resolution, 1 μGal precision with a system noise of 3 μGal/Hz$^{1/2}$, 7 Gal range and 1.5 mGal/month drift. This bulk unit can also include a rubidium clock to synchronize the global positioning system. A compact chip-scale gravimeter, however, till date only has a few initial recent suggestions, involving, for example, gravimeters with capacitative readout.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and devices particularly pointed out in the written description and claims thereof, as well as from the appended drawings.

Accordingly, some example embodiments may enable the provision of a chip-scale high-performance gravimeter through cavity optomechanics and methods for using the same. Exemplary embodiments of the present disclosure may provide, for example, a compact and array-scalable optical readout gravimeter, with, for example, 10 μGal/Hz1/2 (or ~10 ng/Hz1/2) noise levels at 20 mHz sampling rates, and methods for using the same. The cavity optomechanical measurement sensitivity (up to ~5×10-17 m/Hz1/2) can benefit, for example, from the low amplitude and phase noise of coherent laser sources. This exemplary approach can extend, for example, prior work on cavity optomechanics, such as, e.g., photonic crystal based slot-cavities for laser cooling of mesoscopic states, and nonclassical phase control of phonon states through coupled cavity optomechanical modes.

In one example embodiment, a method of determining a gravitational force is provided. The method may include providing at least one first radiation to at least one optomechanical oscillator where the at least one optomechanical oscillator is structured to deform under the gravitational force to cause a shift in resonance associated with the at least one optomechanical oscillator. The method may further include receiving at least one second radiation from the at least one optomechanical oscillator where the at least one second radiation is associated with the shift in the resonance. The method may further include determining the shift in the resonance based on the first and second radiations.

In another example embodiment, a non-transitory computer readable medium for determining a shift in a resonance associated with at least one optomechanical oscillator is provided. The computer readable medium may include instructions stored therein and may be accessible by a hardware processing arrangement. When the processing arrangement executes the instructions, the processing arrangement may be configured to perform at least one procedure that may include directing at least one first radiation to at least one optomechanical oscillator where the at least one optomechanical oscillator is structured to deform under the gravitational force to cause a shift in resonance associated with the at least one optomechanical oscillator. The at least one procedure may further include receiving at least one second radiation from the at least one optomechanical oscillator where the at least one second radiation is associated with the shift in the resonance. The at least one procedure may further include determining the shift in the resonance based on the first and second radiations.

In another example embodiment, an apparatus is provided for measuring gravitational force including at least one optomechanical oscillator, the at least one optomechanical oscillator having an initial resonance, and a second resonance when displaced by gravitational force; and at least one photonic crystal having at least one cavity coupling optical and mechanical degrees of freedom of the oscillator.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and device of the disclosed subject matter. Together with the description, the drawings serve to explain the principles of the disclosed subject matter.

BRIEF DESCRIPTION OF THE SEVERAL VIEWS OF THE DRAWING(S)

FIG. 1 is a representation of an exemplary embodiment in accordance with the disclosed subject matter.

FIG. 2 is an enlarged view of the portion denoted "2" in dashed line in FIG. 1 in accordance with the disclosed subject matter.

FIG. 3 is an enlarged view of the portion denoted "3" in dashed line in FIG. 2 in accordance with the disclosed subject matter.

FIG. 4 is an enlarged view of the portion denoted "4" in dashed line in FIG. 2 in accordance with the disclosed subject matter.

FIG. 5 is a representation of an exemplary embodiment in accordance with the disclosed subject matter.

FIG. 6 is an enlarged view of the portion denoted "6" in dashed line in FIG. 5 in accordance with the disclosed subject matter.

FIG. 7 is an enlarged view of the portion denoted "7" in dashed line in FIG. 5 in accordance with the disclosed subject matter.

FIG. 8 is a representation of an exemplary embodiment in accordance with the disclosed subject matter.

FIG. 9 is an enlarged view of the portion denoted "9" in dashed line in FIG. 8 in accordance with the disclosed subject matter.

FIG. 10 represents measured resonances through collected radiation in accordance with the disclosed subject matter.

FIGS. 11a-f illustrate exemplary optical cavity modes of mode-gap air-slot cavity from finite-difference time domain and band structure calculations.

FIG. 12 illustrates a further exemplary embodiment in accordance with the disclosed subject matter.

Figure 13:
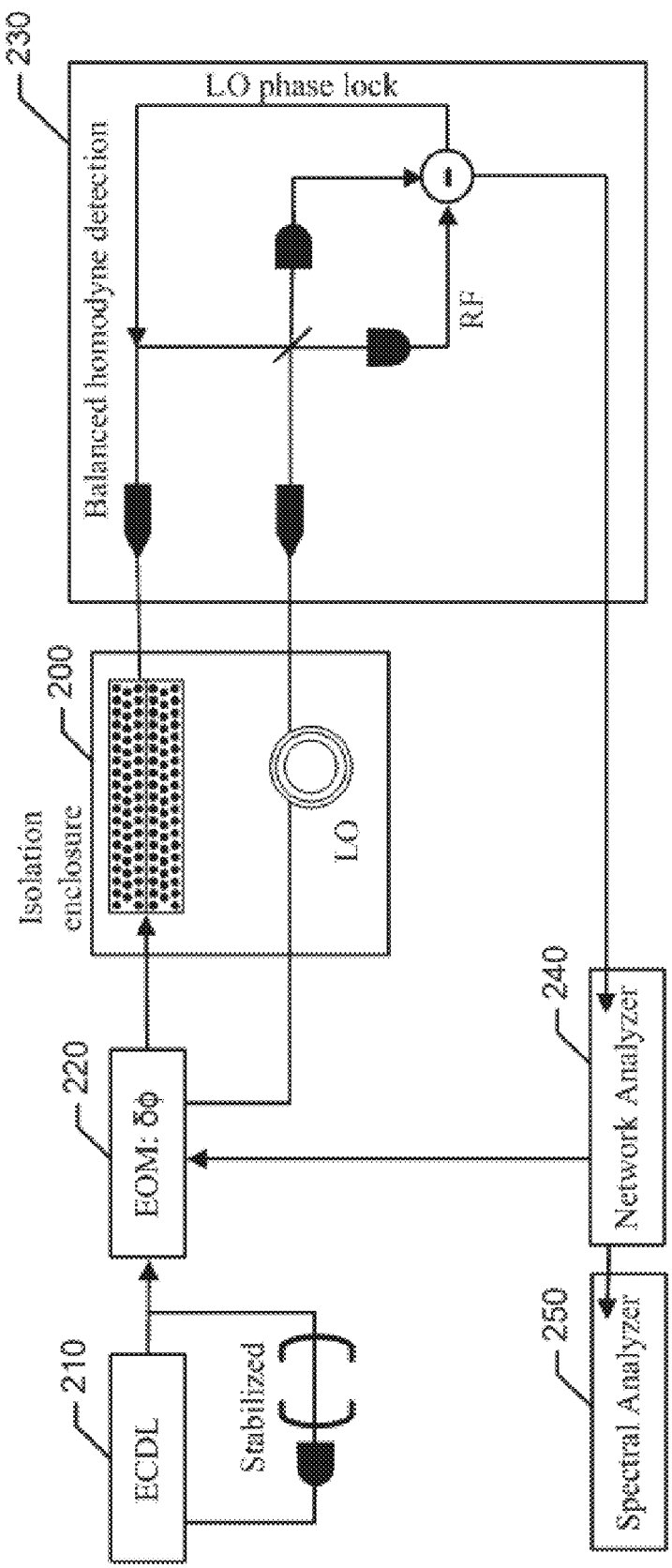

FIG. 13 is a block diagram illustrating an exemplary measurement set up for phase-shift detection of the exemplary device.

Figure 14:
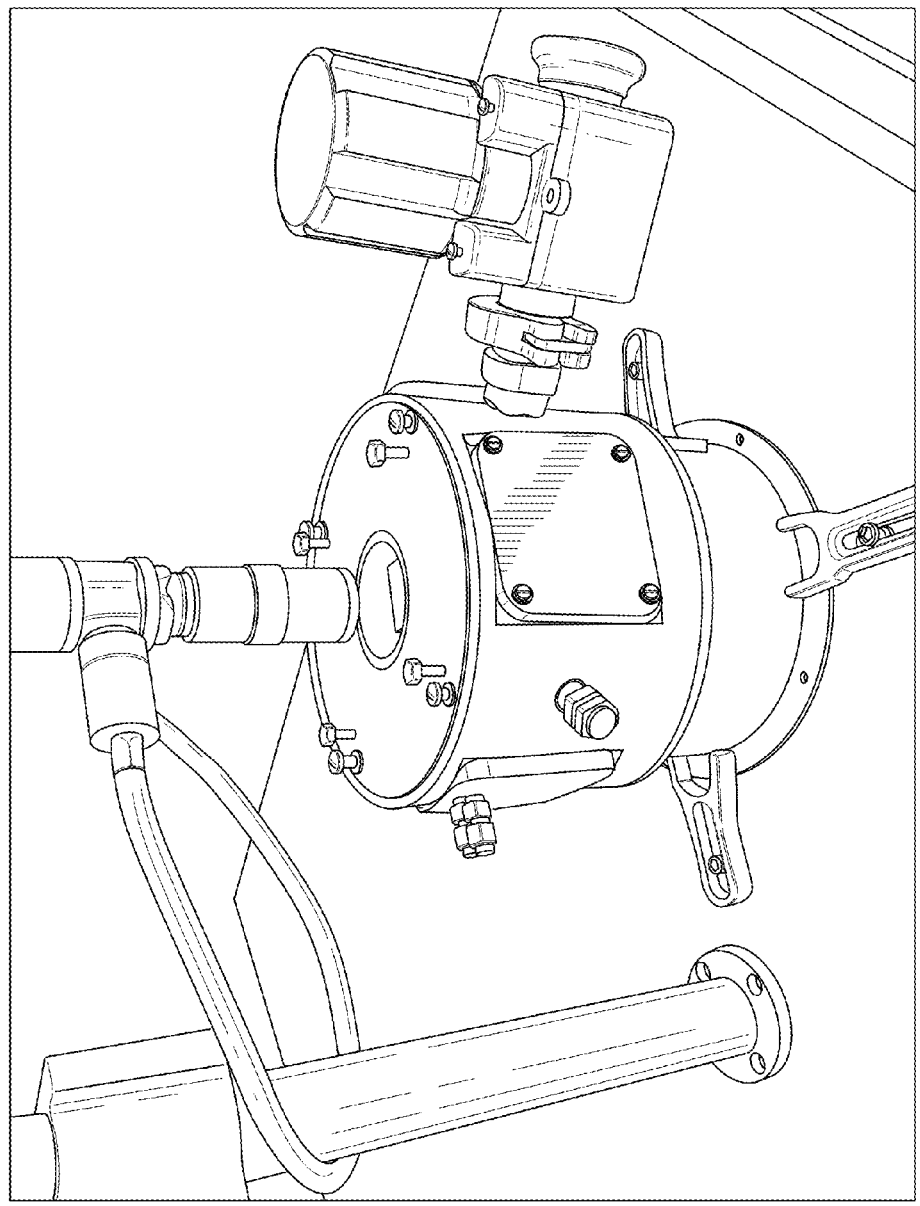
Figure 15:
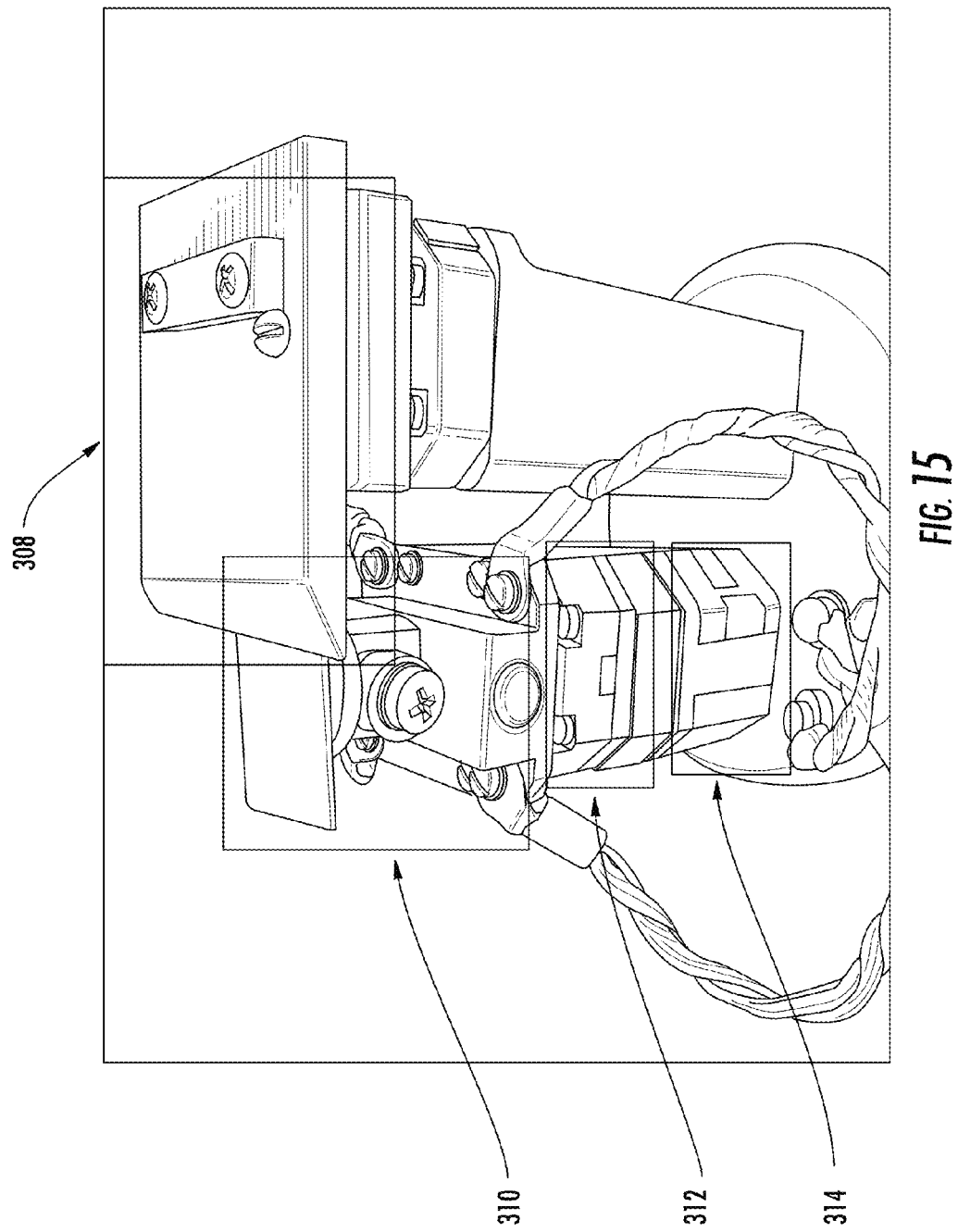

FIGS. 14-15 illustrate an exemplary cryostat chamber for use with the exemplary device.

Figure 16:
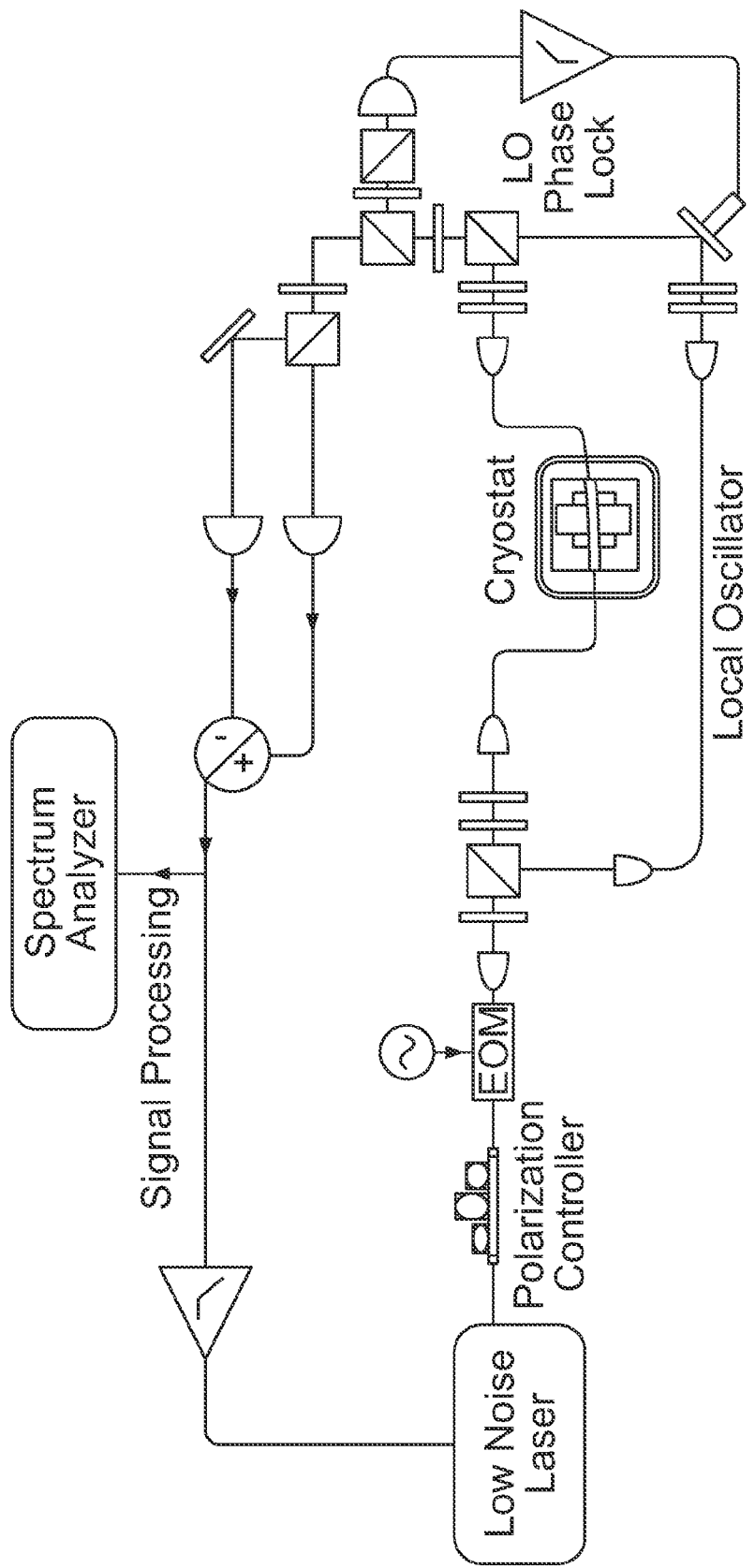

FIG. 16 illustrates a further experimental setup for use with the exemplary device in accordance with the disclosed subject matter.

Figure 17:
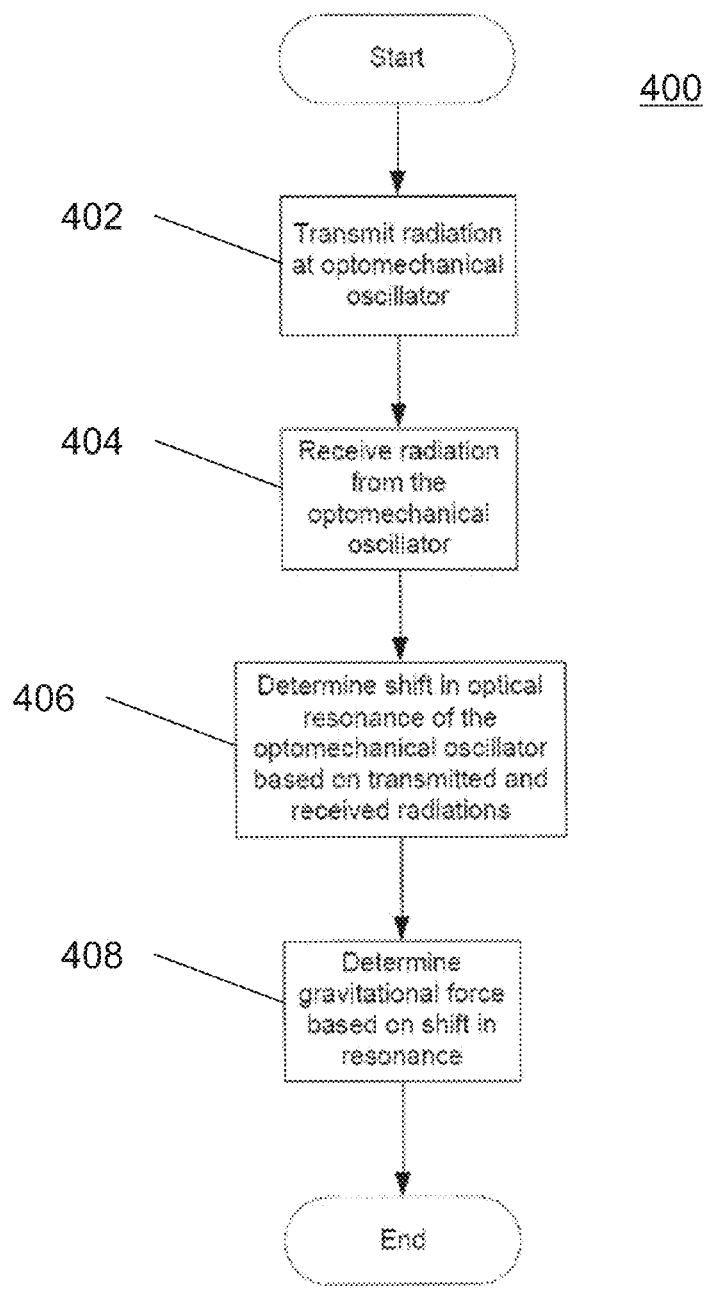

FIG. 17 illustrates an exemplary flow diagram of an exemplary procedure in accordance with the disclosed subject matter.

Figure 18:
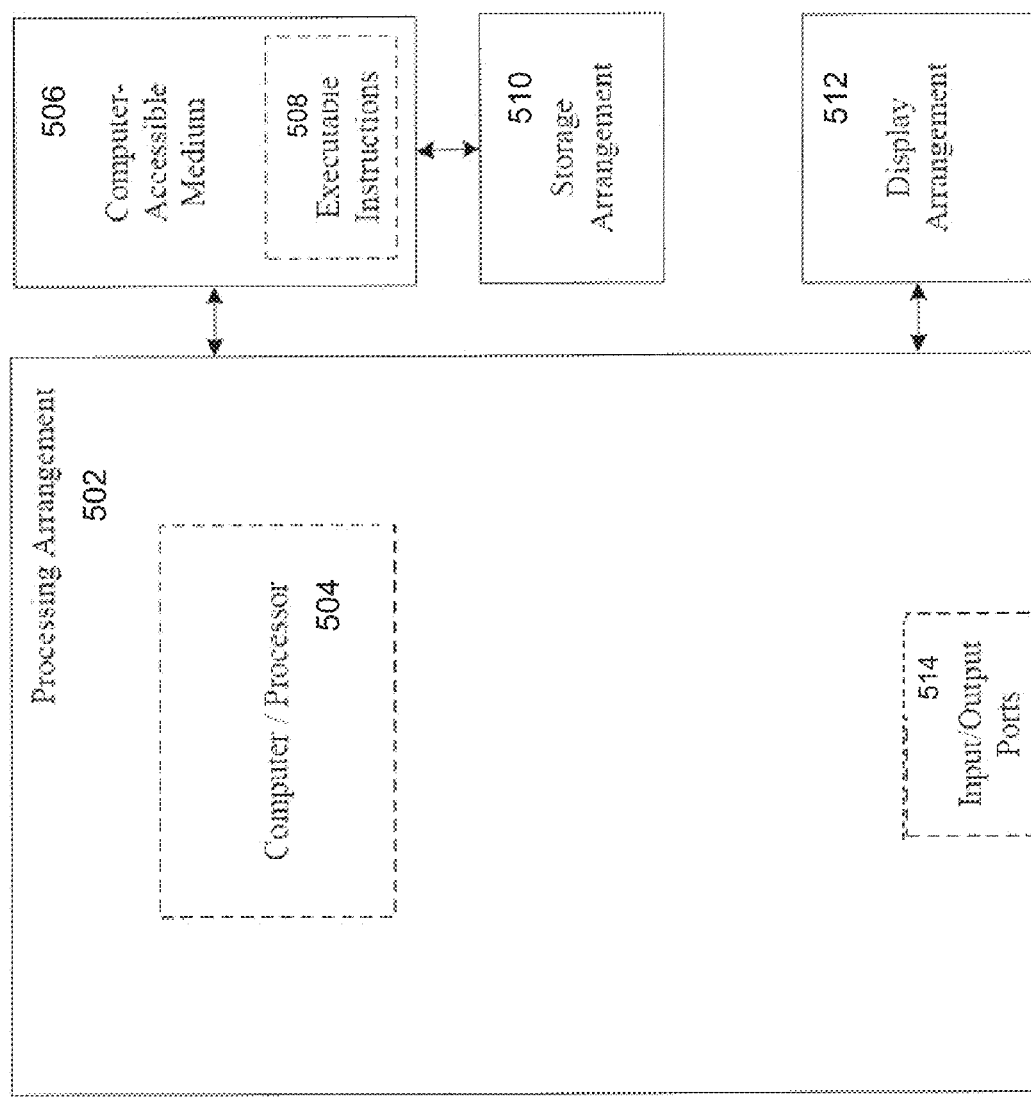
Figure 20:
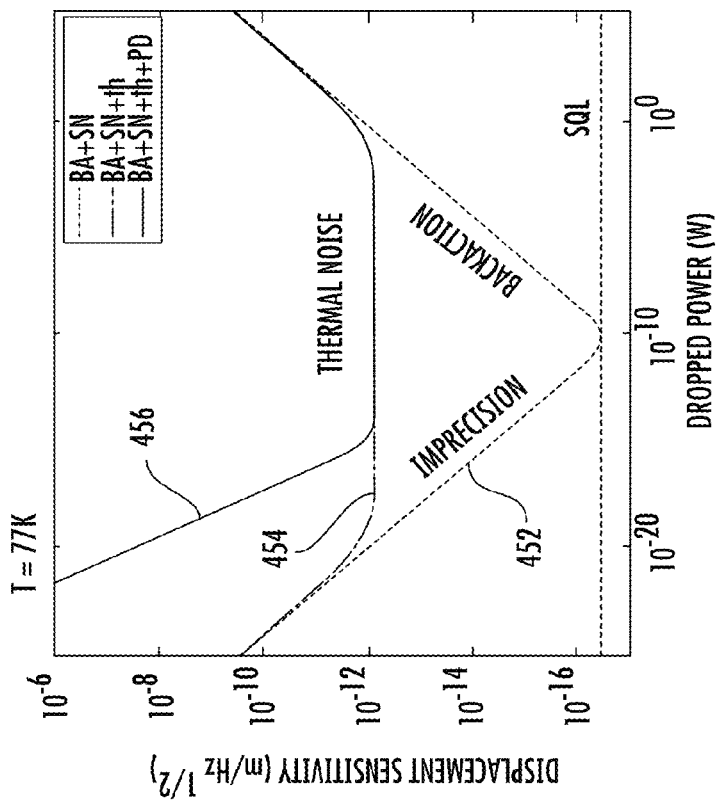
Figure 19:
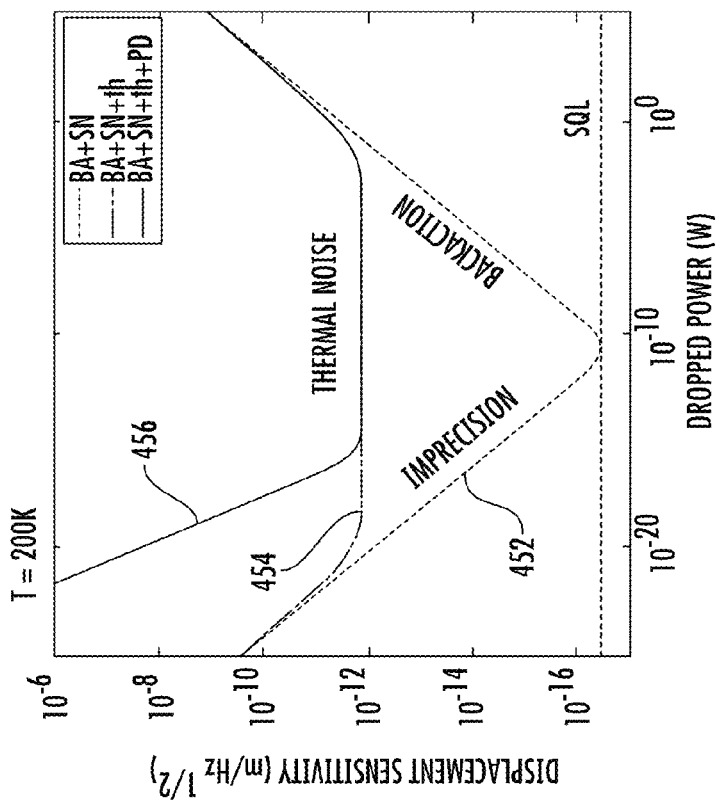

FIG. 18 illustrates an exemplary block diagram of an exemplary system in accordance with the disclosed subject matter.

FIGS. 19-22 illustrate exemplary displacement sensitivity for the exemplary device in accordance with the disclosed subject matter.

FIGS. 23-26 illustrate the effect of a vacuum on the quality factor of the exemplary device in accordance with the disclosed subject matter.

DETAILED DESCRIPTION

Reference will now be made in detail to various embodiments of the disclosed subject matter, an example of which is illustrated in the accompanying drawings. The method and corresponding steps of the disclosed subject matter will be described in conjunction with the detailed description of the device.

Some example embodiments may enable the provision of a chip-scale high-performance gravimeter that may be small and portable, while still providing a relatively high degree of sensitivity. Some embodiments may provide a mass attached to an optomechanical cavity. The impact of gravity on the mass may cause properties of the optomechanical cavity to be altered. For example, if gravity increases, the mass may sag more and cause the width of the cavity to increase. As the cavity dimensions change, the properties of the cavity relative to modulation of a laser passed therethrough may also change. By monitoring changes in the modulation, a determination may be made as to the corresponding change in gravity that caused the change in modulation. Furthermore, example embodiments may couple a non-linear response to the optical field coupled with the small mode volume to provide noise cancellation that increases sensitivity.

The provision of an accurate and sensitive gravimeter that is also portable may enable the gravimeter to be advantageously employed in a number of environments outside of the laboratory. For example, some example embodiments may be useful in connection with conducting large-scale surveys regarding changes in gravitational fields underground, which may be used in connection with oil and gas exploration. Some embodiments may also be useful in connection with performing earth observations relating to geophysics research. Example embodiments may also be employed to perform tunnel detection and underground structure surveys. Such surveys may be useful for national or homeland security applications as well as the mining industry for assessment of the stability of underground structures. In some cases, example embodiments may be used in marine navigation to obtain precise gravity data for global navigation. Many other uses are also possible, and thus the examples above should not be seen as limiting relative to the scope of example embodiments.

Some example embodiments can provide, for example, a compact and array scalable optical readout gravimeter, with, for example, 10 $\mu$Gal/Hz$^{1/2}$ (or ~10 ng/Hz$^{1/2}$) noise levels at 20 mHz sampling rates, and methods for using the same. The cavity optomechanical measurement sensitivity (up to ~5×10$^{-17}$ m/Hz$^{1/2}$) can benefit, for example, from the low amplitude and phase noise of coherent laser sources. This exemplary approach can extend, for example, prior work on cavity optomechanics, such as, e.g., photonic crystal based slot-cavities for laser cooling of mesoscopic states, and non-classical phase control of photon states through coupled cavity optomechanical nodes.

Some example embodiments are illustrated in FIGS. 1-12. In some examples, gravity fluctuations and use shifts in optomechanical resonance are detected as a transduction method. A photonic crystal waveguide is microfabricated as a split structure consisting of a suspended beam and a fixed beam. Light is then directed into the waveguide, as described, and the force of the electromagnetic field displaces one beam relative to the other. For a particular beam geometry and frequency of light, the beam can start to oscillate.

Under the principle of transduction, the intensity of the light transmitted by the waveguide may vary as the beam is displaced by different amounts. Changing gravitational forces may alter the amount one of the beams deflects (and its resonant frequency.) The transmission of the waveguide can be measured. An example device can have multiple modes so a second mode can probe the device to detect the resonance shift.

As illustrated in FIGS. 1-4, an exemplary embodiment of the subject matter includes chip 10 in which a plurality of gravimeters 100 have been fabricated. In some embodiments, gravimeter 100 is "chip-scale," e.g., less than 5 mm, or less than 10 mm square in size. Chips 10 can be manufactured, e.g., using CMOS technology and electrobeam lithography. As illustrated in greater detail in FIG. 2, gravimeter 100 includes a mass 110 suspended by several nano-tethers 112. The mass 110 displaces in the direction denoted "m" in FIG. 2 under the force of gravitation. In some embodiments, the arm width l1/l2 is about 1000 nm.

An optomechanical oscillator 116, which can be a photonic crystal or similar crystal waveguide in one example, is fabricated in the chip 10. The optomechanical oscillator 116 can be fabricated in at least two components, as seen more clearly in FIGS. 5-7. For example, FIGS. 5-7 illustrate one or more gravimeters 100 having masses 110. An optomechanical oscillator 116 is disposed on a given mass 110, and can have a first portion 116a that is fixed and a second portion 116b that is suspended. Air slot 114, also referred to generally herein as a slot, extends between the first portion 116a and the second portion 116b of the oscillator 116. In some embodiments, the slot s has a dimension of about 60 nm to about 110 nm. For example, exemplary slot dimensions include 63.8 nm, 105 nm, etc. The suspended mass is about 700 ng to about 800 ng, e.g., 745.6 ng, 750 ng, etc.

As shown in FIG. 6, and further detailed in FIGS. 8-9, the photonic crystal 116 has holes 118 disposed on a first portion 116a and a second portion 116b thereof, which form opposite sides of slot 114. In addition, the photonic crystal 116 is attached to a large mass 110, as described. As indicated above, as the mass 110 can be impacted by the gravitational field, the width of the slot 114 may be altered and thereby also the modulation experienced as laser energy is passed through the slot 114 (e.g., left to right as seen in FIG. 9) is changed. By monitoring phase and amplitude changes indicative of the modulation changes, changes in gravitational field may be determined. In one example, this can include monitoring first and second radiations of the modulation changes.

FIG. 8 illustrates a scanning electron micrograph (SEM) of mode-gap air-slot cavities. Meanwhile, FIG. 9 illustrates a zoomed in view of the SEM of FIG. 8, and FIG. 10 illustrates example measured resonances through collected radiation according to one example embodiment. As mentioned above, FIGS. 8 and 9 illustrate a plurality of holes 118 disposed within a crystal material (e.g., a photonic crystal 116) such as silicon on opposite sides of a slot 114, which include first portion 116a and second portion 116b, to form an optomechanical cavity. The holes 118 are generally disposed in a pattern on the portions 116a and 116b on opposing sides of the slot 114. The holes 118 can essentially form mirrors so that the slot 114 may form a waveguide through which laser energy may be provided. FIG. 9 shows a zoomed in view of portion 9 of the optical oscillator assembly of FIG. 8. As shown in the portion 9, the holes 118 are displaced to create localized cavity resonances, for example, with a differential shift of $d_A$=14 nm, $d_B$=9 nm, and $d_C$=5 nm. The small arrows in FIG. 9 illustrate the displacement of the holes 118 in this region (e.g., in portion 9). The displacement of the holes 118 in the design causes a different index of refraction to be encountered in the portion 9 where the displaced holes are provided.

The resonance characteristics of the slot 114 can be dependent upon the width of the slot 114. Thus, as a mass 110 that may be attached to the optical oscillator assembly is affected by gravity to make the mass sag, the width of the slot 114 may be altered. The alteration of the width of the slot 114 may then be detected as a change in resonance characteristics of the cavity. For example, the response of the mass 110 to the gravitational field may cause a change in the width of the slot 114. In this regard, the optomechanical oscillator 116 can be configured to deform under the gravitational field (whether by construction using the slot 114 as described or similar constructions).

As the slot 114 flexes in response to the impact of the gravitational field on the mass, a change in the amplitude and phase of laser energy transmitted through the slot 114 may be detected. The change in amplitude and phase of the laser energy may be indicative of the modulation of the laser energy as caused by a change in the gravitational field. In addition, the change can be detected by monitoring and comparing radiation associated with the modulation as transmitted and as received.

Further exemplary specifications of the gravimeters 100 are provided in Table 1 and Table 2:

TABLE 1

|  | Device A | Device B | Device C |
|---|---|---|---|
| gravimeter beam length | 8.6 mm | 4.3 mm | 2 mm |
| beam width (mass width) | 1 μm (9.7 mm) | 1 μm (5 mm) | 1 μm (500 μm) |
| standard Δg sensitivity regime | 10-100 ng | 0.1-1 μg | 1-10 μg |

TABLE 2

Chip-scale optomechanical gravimeter: device C
2 mm beam length; 1 μm beam width (500 μm mass width);
320 nm thickness; slot width (s): 67.65 nm; silicon or silicon nitride
Physical properties

| $Q_o$ | λ (nm) | Ω (Hz) | $Q_m$ | $g_{OM}$ (Hz/m) | m_eff | M | k (N/m) |
|---|---|---|---|---|---|---|---|
| 100,000 | 1550 nm | 10,000 | 1 | 9.80 × 1020 | 745 ng | 750 ng | 6.7 × 1 |
| Measurement parameters | | laser power at 260 μW | | | base temperature at 200 K | | |

In some embodiments, the gravimeter is a chip-scale gravimeter that can be based on, for example, the high-Q/V air-slot photonic crystal mode gap cavity examined for cavity optomechanics. As illustrated in FIG. 10, an exemplary optomechanical oscillator 116 can have a loaded optical Q in excess of $10^4$ measured ($10^6$ theory) while preserving, for example, a deeply-subwavelength optical modal volume V of ~0.02(λ/n)³. The gravitational force can serve to displace (δx) the optomechanical oscillator position. The nanobeams can be provided for a mode displacement that is either common or differential (e.g., such that one nanobeam can be much more compliant than the other)—both of which can result in a perturbation to the optical cavity resonance. For a 100 pg silicon (or silicon nitride) optomechanical cavity with 50 kHz fundamental mechanical mode resonance, e.g., an approximate 4 nm displacement can be observed under 1 g acceleration. These displacements are typically in the first-order perturbative regime for the optical resonance. The resonance shift can depend linearly on the spacing of slot 114 (denoted as spacing s in FIG. 3) at a rate, for example, of ~−0.88 nm wavelength shift per nm of the mechanical oscillator displacement (or equivalently ~3.5 nm wavelength shift for a differential 1 g acceleration). The perturbed optical resonance can be detected through the second mode (II) of the cavity (e.g., as shown in FIGS. 10 and 11*a-f*), measuring the differential transmitted intensity.

FIGS. 11*a-f* illustrate exemplary optical cavity modes of a mode-gap air-slot cavity from finite-difference time-domain and band structure calculations according to example embodiments. FIGS. 11*a-c* illustrate $|E|^2$ spatial distribution a modes I, II and III, respectively. Meanwhile, FIGS. 11*d-f* illustrate corresponding first three slot photonic crystal waveguide modes, with Hz and $|E|^2$ distributions illustrated from band structure calculations.

Exemplary Noise Considerations

The mechanical oscillator displacement sensitivity in high-Q/V systems such as the disclosed subject matter can be remarkable, with an experimentally-observed minimal photoreceiver-noise-limited sensitivity of, for example, ~5× $10^{-17}$ m/Hz$^{1/2}$, or about four times the standard quantum limit. In a homodyne detection, the theoretical shot-noise-limited displacement sensitivity of the cavity optomechanical system can be described by the following equation:

$$\delta x_{min} \cong \frac{\lambda}{8\pi Q \sqrt{\eta P / \hbar \omega}}$$

For the exemplary cavity Q of ~40,000, P at 1 μW and scaling coefficient η of 0.5, the displacement sensitivity can reach ~8×$10^{-19}$ m/Hz$^{1/2}$ theoretically, which can be even feasible for zero-point motion detection with a 1 kHz resolution bandwidth, if the readout laser has quantum limited amplitude and phase noise.

The practical noise contributions can arise, for example, from thermal Brownian noise, photoreceiver (detector) noise, optical shot noise, and quantum backaction noise from optical gradient force fluctuations.

The thermal Brownian motion can be represented as follows:

$$S_{xx}^{th}(\Omega) = \frac{4k_B T m_x \Omega_M}{Q_M} \chi_M^2(\Omega)$$

$$|\chi(\Omega)|^2 = \frac{1}{m_{eff}^2((\Omega_m^2 - \Omega^2)^2 + \Gamma_m^2 \Omega^2)}$$

The optical shot noise comes from noise in the light field at the output. The noise spectrum contains all the information on the mechanical displacement spectrum, but also a background term that is due to the quantum noise. This background constitutes the imprecision of the measurement. The optical shot noise is represented as follows:

$$S_{xx}^{SN}(\Omega_M) = \left(\frac{2\hbar\omega_0^3\left(\frac{(1+K)^2}{3K} - 1\right)}{3\eta g_{OM}^2 Q^2}\right) P_d^{-1}$$

The detector noise can be represented as follows:

$$S_{xx}^{PD}(\Omega_M) = \left(\frac{2\omega_0^2}{3g_{OM}^2 Q^2}\right)\left(\frac{NEP}{P_d}\right)^2$$

The measurement of the oscillator's position disturbs. In the case of an optomechanical system, this is due to the fluctuation of intracavity radiation pressure. The force noise is referred to as quantum backaction noise, and is represented as follows:

$$S_{xx}^{BA}(\Omega) = 6\hbar g_{OM}^2 \frac{KQ^2}{\omega_0^3}\chi_M^2(\Omega)P_d$$

Figure 22:
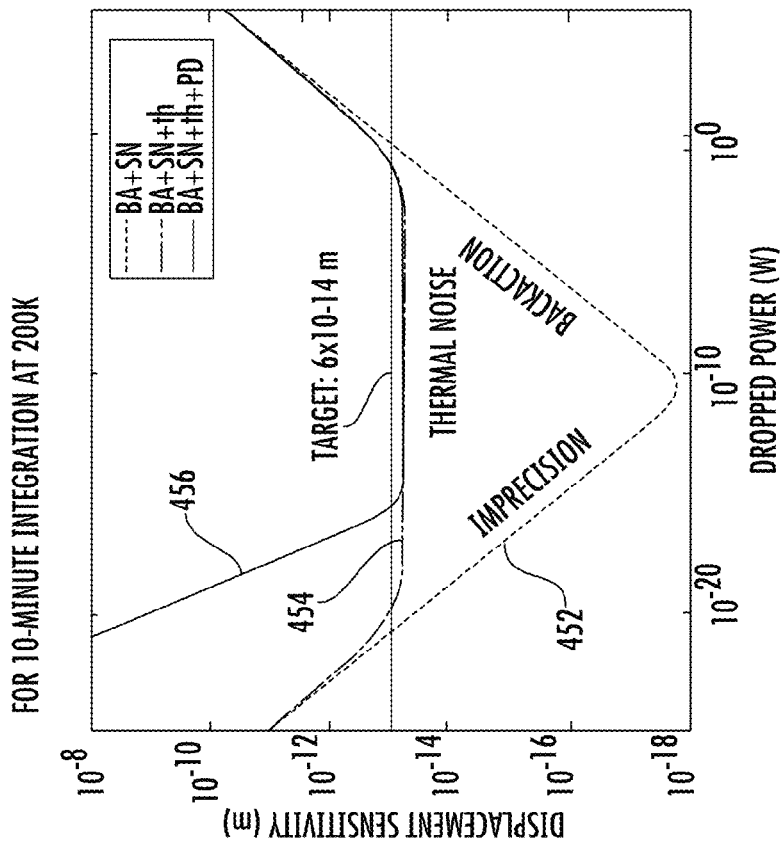
Figure 21:
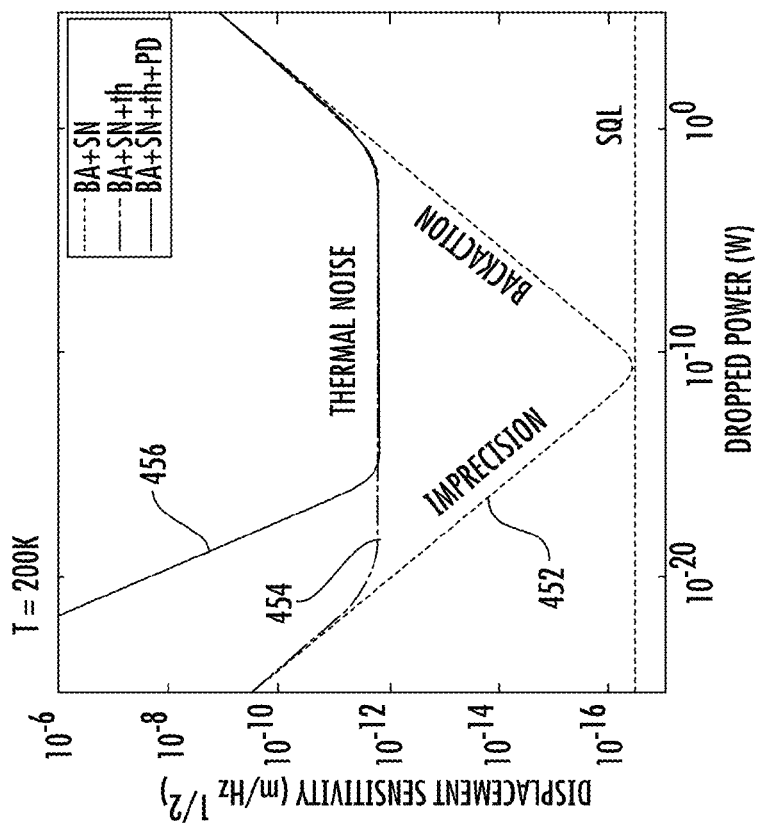
Figure 23:
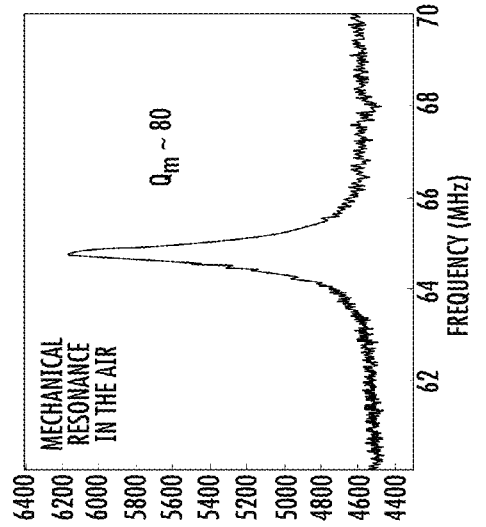

Balanced homodyne phase-sensitivity measurement is described. Displacement sensitivity for the exemplary gravimeter design is illustrated in FIGS. 19-22. Backaction noise (BA)+shot noise (SN)+thermal noise (th)+photodetector noise (PD). (In the Figures, Backaction noise (BA)+shot noise (SN) is illustrated as line 452. BA+SN+th is illustrated as line 454. BA+SN+PD is illustrated as line 456.) The Black dashed line is standard quantum limit (SQL) in the exemplary design. For a 2 mm length device to get a 1 μg gravity change resolution, a displacement sensitivity lower than 6×$10^{-14}$ m is needed, as illustrated in FIG. 22. A 280 kHz measurement bandwidth or 4.6 minutes integration can achieve this, at 200K or room temperature. (To achieve 10 ng, the device is designed for 8.6 mm length.)

Since the device and systems described herein detect the transmission of light, the RF spectrum shows us the noise power-spectral-density (PSD) directly, which arise from the contribution of the thermal Brownian noise, photoreceiver (detector) noise, optical shot noise, and quantum backaction noise. With $$P_m(\omega) = \frac{dT}{d\Delta}\eta_{in} P_{in} g_{OM} x(\omega)$$

Exemplary embodiments of the present disclosure can also facilitate Pound-Drever-Hall locking and detection—this phase sensitive detection technique can allow a direct measurement of nanomechanical position (see example measurement setup in FIG. 13).

FIG. 13 illustrates an exemplary block diagram of a measurement setup that may be employed for phase-shift detection according to an example embodiment of a chip-scale optical gravimeter. As shown in FIG. 13, an isolation enclosure 200 may be provided to contain the chip-scale optical oscillator assembly for optomechanical gravimetry of FIGS. 8-9. The isolation enclosure may be fed by an external cavity diode laser (ECDL) 210 via an electro-optical modulator (EOM) 220, which may act as a phase shifter. A detection circuit 230 may be provided for balanced homodyne detection, which may be coupled to a network analyzer 240 and a spectral analyzer 250. The apparatus of FIG. 13 may employ a balanced homodyne detection implemented Mach-Zehnder fiber interferometer and the EOM phase-shifter may facilitate measurement calibration.

In any case, measurement of nanomechanical position can facilitate the characterization of the displacement noise spectrum and the thermal Brownian motion [given, e.g., as 2 $k_B T_{sense}/m_{eff}\Omega_m\Gamma_m$ where $T_{sense}$ can be the effective temperature of the sensing (e.g., fundamental) mechanical mode, $m_{eff}$ can be the effective mass of the mechanical mode, $\Omega_m$ can be the resonance frequency, and $\Gamma_m$ can be the mode decay rate] of the chip-scale optomechanical gravimeter.

FIGS. 14-15 illustrate a cryostat chamber which operates at a high vacuum, e.g., about $10^7$ Torr and at low temperatures, e.g., about 10K. FIG. 15 illustrates the components of the setup, which include fiber holder 308, sample holder 310 for supporting the device 10, scanner 312 applying sinusoidal acceleration, and positioner fiber coupling 314.

FIG. 16 illustrates a set up for quantum-limited phase measurement. The signal beam and a phase reference beam are derived from the same laser. A probing beam is sent through a coupling taper and interacts with the photonic crystal cavity. The LO travels in the reference arm of a Mach-Zehnder interferometer over the same distance. It is finally recombined with the signal beam at a polarizing beam splitter. Spatial mode matching of the incident beams is enhanced by using single-mode fiber as mode filter on the local oscillator. After spatial recombination, interference is enforced using a retarder plate and another polarizing beam splitter. The laser source can preferably exhibit quantum-limited amplitude and phase noise at Fourier frequency$\geq$10 KHz and power level$\leq$1 mW.

Exemplary Resonant detection: It is likely that a resonantly-driven measurement provide a better signal-to-noise to achieve the $10^{-8}$ sensitivities desired for the gravimeter. In the present case, the optical gradient force can drive the exemplary system on its RF mechanical resonance $\Omega_m$. The optical gradient force can arise from, for example, the evanescent optical fields and can be calculated through the Maxwell stress tensor and first-order perturbation theory. The optical force can give rise to an optical stiffening of the RF resonance, a resonance shift ($\Omega'_m - \Omega_m$) that can depend on the gravity-induced slot displacement as described by $$\Omega'^2_m = \Omega^2_m + \left(\frac{2|a_o|^2 g^2_{om}(\delta x)}{\Delta^2 \omega_c m_x}\right)\Delta'_o,$$

where the optical interaction rate $g_{om}$ can be dependent on the gravity-induced slot displacement $\delta x$, $|a_o|^2$ can be the time-averaged $\Delta'_o$ the laser-cavity detuning, and $\Delta^2 \equiv \Delta'^2_o + (\Gamma_0/2)^2$ with $\Gamma_0$ the optical cavity photon decay rate. For a fixed laser-optical resonance detuning, the input laser power can be swept; the resulting characteristic slope of the mechanical frequency optical stiffening can differ for varying gravitational forces.

The high transduction sensitivity can benefit from the low amplitude and phase noise of coherent laser sources, in addition to the resonant driving approach. Further, resonant nanomechanical oscillators—by going to higher frequencies—can facilitate mass sensing in the range of attograms to zeptograms ($10^{-21}$ grams), equivalent to the inertia force of several xenon atoms or an individual kDa molecule. The frequency shift can be read out electrically. This differential inertia force sensitivity can range ~from 1 part in $10^5$ to 1 part in $10^{12}$, very promising to reach $10^{-8}$ sensitivities desired in this gravimeter implementation. With the two-available optical cavity modes and wavelength-division multiplexing, a combined drive-and-sense protocol can also be implemented in the chip-scale optical gravimeter for compactness, noise normalization and robustness.

Exemplary Measurement considerations: The physical measurements and device nanofabrication can be examined, along with approaches to suppress the primarily noise sources. For field deployment, commercially available vertical cavity surface emitting lasers with low relative intensity noise can be embedded. The exemplary chip gravimeter can be packaged in vacuum that can facilitate the resonant mass to be kept constant to avoid, for example, spurious frequency shifts, to attain a high quality factor mechanical resonance, and to avoid molecular dynamical noise. The exemplary sensor can also be placed in vibration-isolated mounts (such as, e.g., from Minus-K) so as to suppress seismic noise. With an exemplary sampling rate in the range of 20 mHz and the tens to hundreds kHz resonances, e.g., a large sampling to average down the noise fluctuations can be feasible, although long-term (e.g., in the period of days) drift corrections are preferably carefully considered. A referencing between two (or more) gravimeters on the same chip should normalize out much of the seismic noise, while facilitating more rapid data acquisition. Readout noise and resonant dynamic range can be examined, from nonlinear optical stiffening at the high end (e.g., to avoid nonlinear Duffing instability), to source and detector shot noise at the low end. Thermoelectric cooling of the chip can also be examined for possible noise reductions. For exemplary absolute measurements, the exemplary chip-scale gravimeter can also be calibrated at a known-gravity site or with a laser-interferometer absolute gravimeter, although calibration variability are preferably carefully examined. The chip-scale implementation can also provide arrayed capability, such as for tensor gradiometer and parallel multiple measurements for improved noise averaging and multi-modal functionality in the same compact package.

FIG. 17 shows an exemplary flow diagram of an exemplary procedure 400 according to an exemplary embodiment of the present disclosure. For example, as shown in FIG. 17, a radiation (e.g., a nanobeam) can be directed at an optomechanical oscillator at 402. The optomechanical oscillator can be similar to that which has been described above in connection with FIGS. 1-12. Thereafter, a resulting radiation from the optomechanical oscillator can be received at 404, and a shift in the resonance of the optomechanical oscillator can be determined at 406. This shift in the resonance of the optomechanical oscillator can be used to determine a gravitational force or field at 408.

FIG. 18 shows an exemplary block diagram of an exemplary embodiment of a system according to the present disclosure. For example, exemplary procedures in accordance with the present disclosure described herein can be performed by a processing arrangement and/or a computing arrangement 502. Such processing/computing arrangement 102 can be, e.g., entirely or a part of, or include, but not limited to, a computer/processor 504 that can include, e.g., one or more microprocessors, and use instructions stored on a computer-accessible medium (e.g., RAM, ROM, hard drive, or other storage device).

As shown in FIG. 18, e.g., a computer-accessible medium 506 (e.g., as described herein above, a storage device such as a hard disk, floppy disk, memory stick, CD-ROM, RAM, ROM, etc., or a collection thereof) can be provided (e.g., in communication with the processing arrangement 502). The computer-accessible medium 506 can contain executable instructions 508 thereon. In addition or alternatively, a storage arrangement 510 can be provided separately from the computer-accessible medium 506, which can provide the instructions to the processing arrangement 502 so as to configure the processing arrangement to execute certain exemplary procedures, processes and methods, as described herein above, for example. The exemplary instructions and/or procedures can be used for determining a shift in a resonance associated with at least one optomechanical oscillator based on, e.g., the exemplary procedure described herein and associated with the exemplary embodiment of FIG. 17.

Further, the exemplary processing arrangement 502 can be provided with or include an input/output arrangement 514, which can include, e.g., a wired network, a wireless network, the internet, an intranet, a data collection probe, a sensor, etc. As shown in FIG. 18, the exemplary processing arrangement 502 can be in communication with an exemplary display arrangement 512, which, according to certain exemplary embodiments of the present disclosure, can be a touch-screen configured for inputting information to the processing arrangement in addition to outputting information from the processing arrangement, for example. Further, the exemplary display 512 and/or a storage arrangement 510 can be used to display and/or store data in a user accessible format and/or user-readable format.

It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously.

Accordingly, some example embodiments may be provided to employ a relatively small and potentially mobile assembly for conducting gravimetry measurements. In this regard, some example embodiments may provide a chip-scale gravimeter that is capable of measuring relatively small and/or slow changes in gravitational fields with a relatively high degree of sensitivity. Example embodiments may provide a small space for light to pass through with a strong non-linear interaction employed to couple optic and mechanical modes. The non-linear response to the optical field coupled with the small mode volume of example embodiments, which small mode volume may be provided as the volume between a slot and mirror-like holes formed on either side of the slot within a photonic crystal, may provide noise cancellation that provides superior sensitivity for example embodiments.

Figure 24:
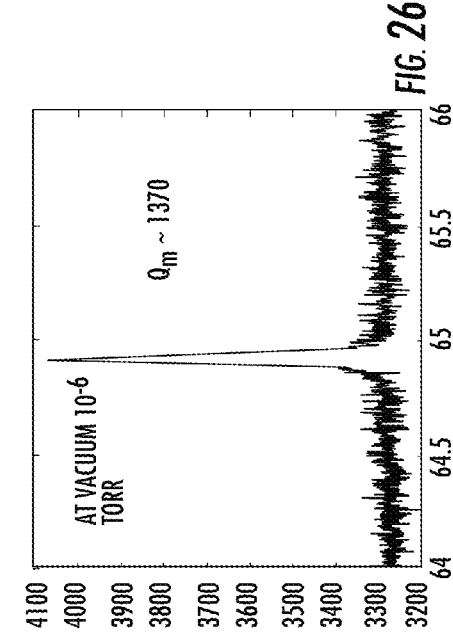
Figure 25:
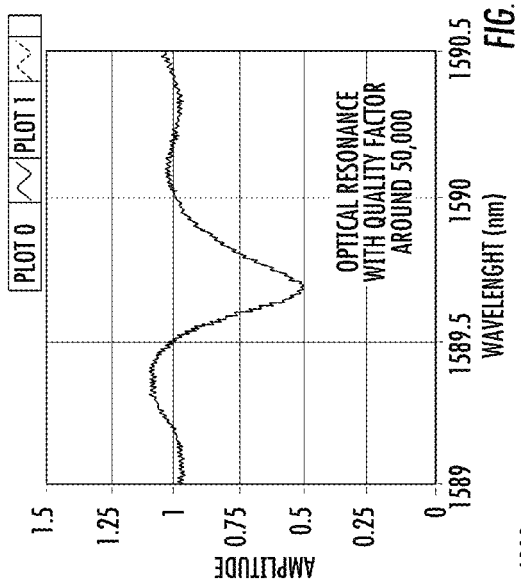
Figure 26:
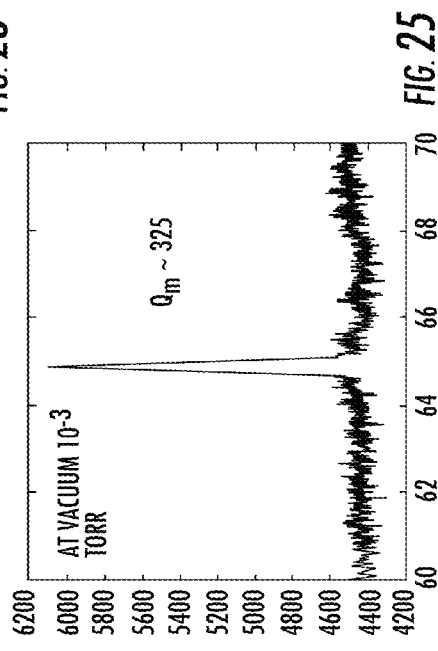

FIGS. 23-26 illustrate improvements in mechanical quality factor which occur in vacuum, e.g., 10-6 mbar vacuum, in which the mechanical quality factor was improved 20 times. FIG. 24 illustrates the mechanical resonance in the air (Qm~80). FIG. 25 illustrates the mechanical resonance at vacuum of $10^{-3}$ Torr (Qm~325), and FIG. 26 illustrates the mechanical resonance at a vacuum of $10^{-6}$ Torr (Qm~1370).

Many modifications and other embodiments of the example embodiments of the invention set forth herein will come to mind to one skilled in the art to which these embodiments pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method of determining a gravitational force, the method comprising:
   providing at least one first radiation to at least one optomechanical oscillator, the at least one optomechanical oscillator being structured to deform under the gravitational force to cause a shift in resonance associated with the at least one optomechanical oscillator, wherein the at least one optomechanical oscillator includes a photonic crystal separated into a first portion and a second portion by an air slot, a width of the air slot is structured to be altered under the gravitational force;
   receiving at least one second radiation from the at least one optomechanical oscillator, wherein the at least one second radiation is associated with the shift in the resonance, wherein the air slot forms a waveguide through which the first radiation and the second radiation travel; and
   determining the shift in the resonance based on the first and second radiations, wherein the shift in the resonance is associated with the alteration of the width of the air slot through which the first and second radiations travel.

2. The method of claim 1, further comprising determining a change in the gravitational force based on the shift in the resonance.

3. The method of claim 1, wherein determining the shift comprises measuring modulation associated with an optomechanical cavity, the modulation being determined by comparing the first and second radiations.

4. The method of claim 3, wherein measuring the modulation comprises measuring an amplitude and phase of the second radiation.

5. A non-transitory computer readable medium for determining a shift in a resonance associated with at least one optomechanical oscillator, the computer readable medium including instructions stored therein and accessible by a hardware processing arrangement, wherein, when the processing arrangement executes the instructions, the processing arrangement is configured to perform at least one procedure comprising:
   directing at least one first radiation to at least one optomechanical oscillator, the at least one optomechanical oscillator being structured to deform under the gravitational force to cause a shift in resonance associated with the at least one optomechanical oscillator, wherein the at least one optomechanical oscillator includes a photonic crystal separated into a first portion and a second portion by an air slot, a width of the air slot is structured to be altered under the gravitational force;
   receiving at least one second radiation from the at least one optomechanical oscillator, wherein the at least one second radiation is associated with the shift in the resonance, wherein the air slot forms a waveguide through which the first radiation and the second radiation travel; and determining the shift in the resonance based on the first and second radiations, wherein the shift in the resonance is associated with the alteration of the width of the air slot through which the first and second radiations travel.

6. The computer readable medium of claim 5, wherein the processing arrangement is further configured to determine a change in the gravitational force based on the shift in the resonance.

7. The computer readable medium of claim 5, wherein determining the shift comprises measuring modulation associated with an optomechanical cavity, the modulation being determined by comparing the first and second radiations.

8. The computer readable medium of claim 7, wherein measuring the modulation comprises measuring an amplitude and phase of the second radiation.

9. An apparatus for measuring gravitational force comprising:
   at least one optomechanical oscillator, the at least one optomechanical oscillator having an initial resonance, and a second resonance when displaced by gravitational force;
   at least one radiation source arrangement to direct at least one first radiation towards the at least one optomechanical oscillator;
   at least one photonic crystal having:
      at least one cavity coupling optical and mechanical degrees of freedom of the oscillator, and
      at least one air slot separating the at least one photonic crystal into a first portion and a second portion, the at least one air slot forming a waveguide through which the at least first radiation travels, wherein a width of the at least one air slot is structured to be altered under the gravitational force;
   at least one detecting arrangement to at least one of receive or detect at least one second radiation from the at least one at least one optomechanical oscillator; and
   at least one hardware processing arrangement to determine:
      the shift in the resonance associated with the at least one optomechanical oscillator based on the first and second radiations, wherein the shift in the resonance is associated with the alteration of the width of the at least one air slot, and
      the gravitational force based on the shift in the resonance.

10. The apparatus of claim 9, wherein the at least one cavity includes a high Q/V air-slot photonic crystal mode gap cavity.

11. The apparatus of claim 9, further comprising a mass suspended by one or more tethers on which the at least one optomechanical oscillator is disposed.

12. The apparatus of claim 9, wherein the at least one air slot is associated with an optomechanical cavity, and wherein a mass is coupled to the optomechanical cavity such that a change in the gravitational force impacts the mass by correspondingly changing a size of the optomechanical cavity to cause the shift in the resonance.

13. The apparatus of claim 9, wherein the at least one optomechanical oscillator comprises a chip-scale optical oscillator employing a material having a nonlinear response to an optical field to cause the shift in resonance based on a nonlinear interaction coupling optical and mechanical modes.

14. The apparatus of claim 9, wherein the at least one optomechanical oscillator comprises a chip-scale optical oscillator employing the photonic crystal defining the at least one air slot having holes formed in the photonic crystal on opposite sides of the at least one air slot for forming the waveguide for an optical signal to travel through the at least one air slot.

15. The apparatus of claim 14, wherein a width of the air slot is changeable responsive to a change in the gravitational force such that a change in the width of the air slot causes the shift in the resonance, and wherein the shift in resonance is measured to provide an indication of the change in the gravitational force.

* * * * *